J. B. CONRAD.
ELECTRIC MOTOR.
APPLICATION FILED JULY 2, 1913.

1,132,445.

Patented Mar. 16, 1915.
8 SHEETS—SHEET 2.

Witnesses
H. S. McDowell
J. J. McCarthy

Inventor
J. B. Conrad,
By Victor J. Evans
Attorney

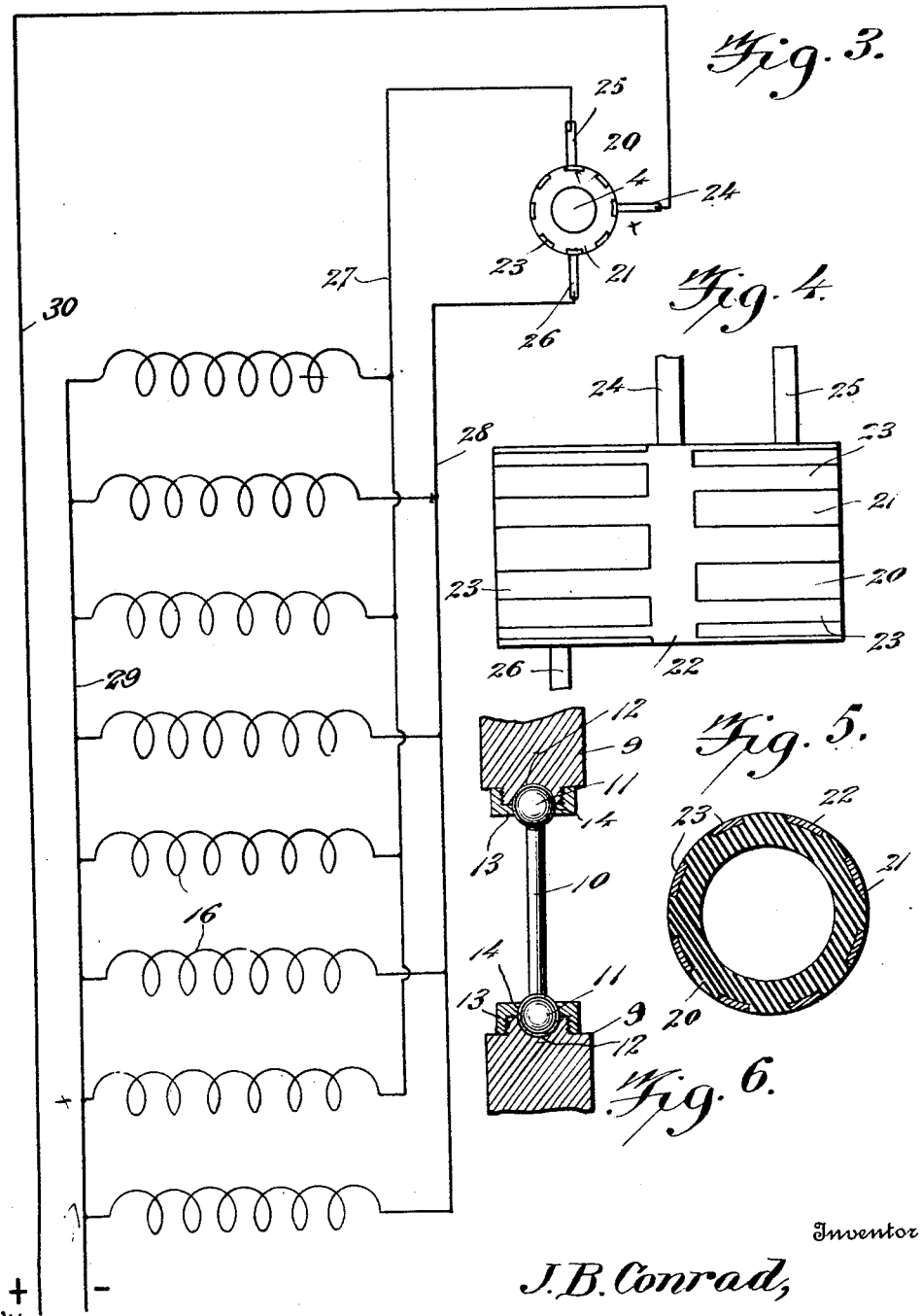

SUBSTITUTED FOR MISSING COPY

UNITED STATES PATENT OFFICE.

JOHN B. CONRAD, OF NICOLAUS, CALIFORNIA.

ELECTRIC MOTOR.

1,132,445.  Specification of Letters Patent.  Patented Mar. 16, 1915.

Application filed July 2, 1913. Serial No. 777,031.

*To all whom it may concern:*

Be it known that I, JOHN B. CONRAD, a citizen of the United States, residing at Nicolaus, in the county of Sutter and State of California, have invented new and useful Improvements in Electric Motors, of which the following is a specification.

This invention relates to improvements in electric motors and has particular application to what are known as solenoid engines.

In carrying out the present invention, it is my purpose to provide a solenoid engine which will embody among other features a plurality of cores connected in belt formation and a set of solenoid magnets surrounding each run of the belt so formed and connected in an electric circuit and each divided into two groups composed of alternate magnets of the respective set, a commutator being provided for each set and controlling the flow of current thereto in such manner that when one group is active or energized, the other is inactive or deënergized, the commutators being so timed relatively to one another that the corresponding groups of the sets are energized simultaneously whereby a smooth and easy motion is imparted to the belt thereby enabling the engine to run or operate for a relatively long period of time without renewing the bearings or parts.

It is also my purpose to provide a motor of the type set forth which will embrace the desired features of simplicity, efficiency and durability, one which may be manufactured, installed and maintained at a minimum expense and one whereby the maximum power may be developed with a minimum consumption of current.

With the above and other objects in view, the invention consists in the construction, combination and arrangement of parts hereinafter set forth in and falling within the scope of the claim.

Figure 1:
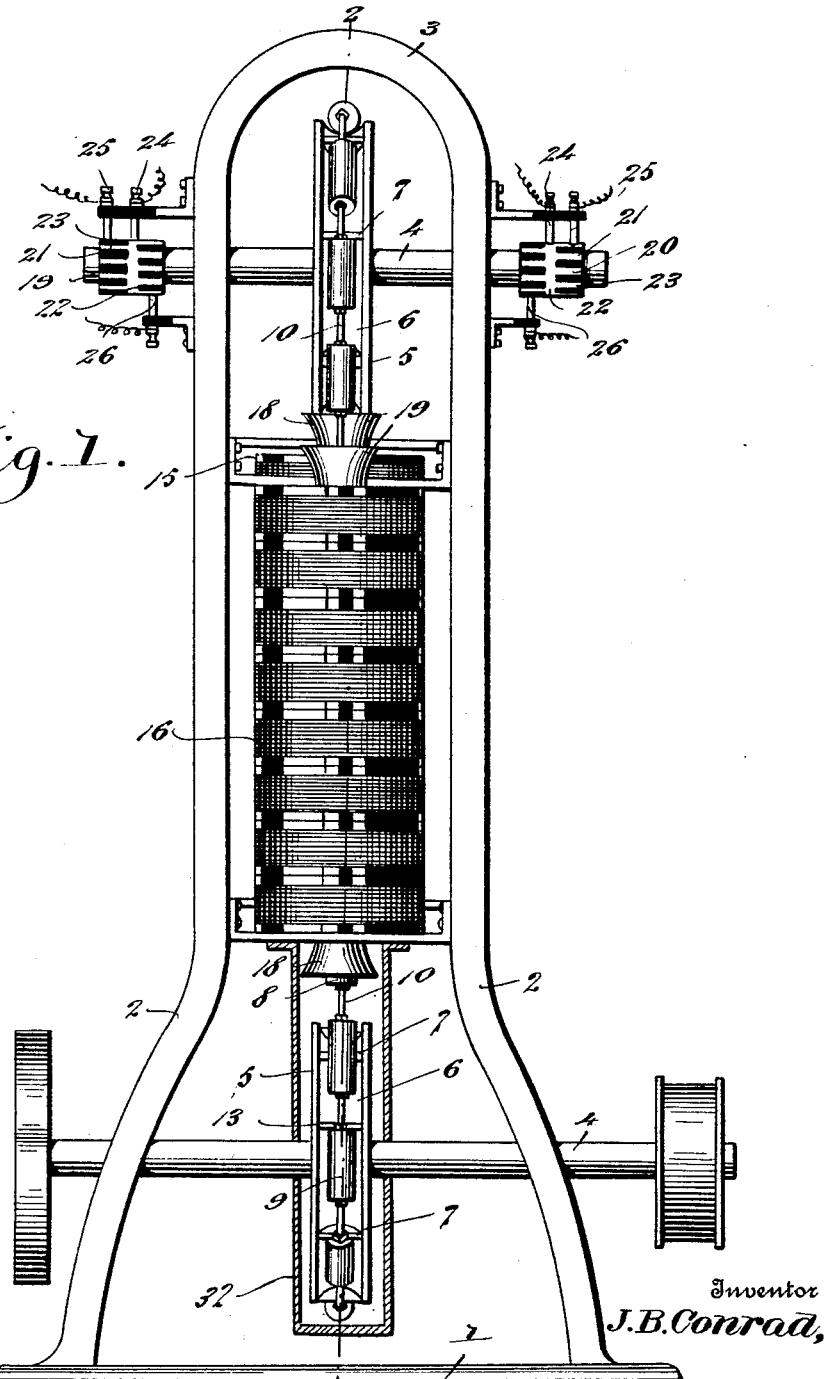
Figure 2:
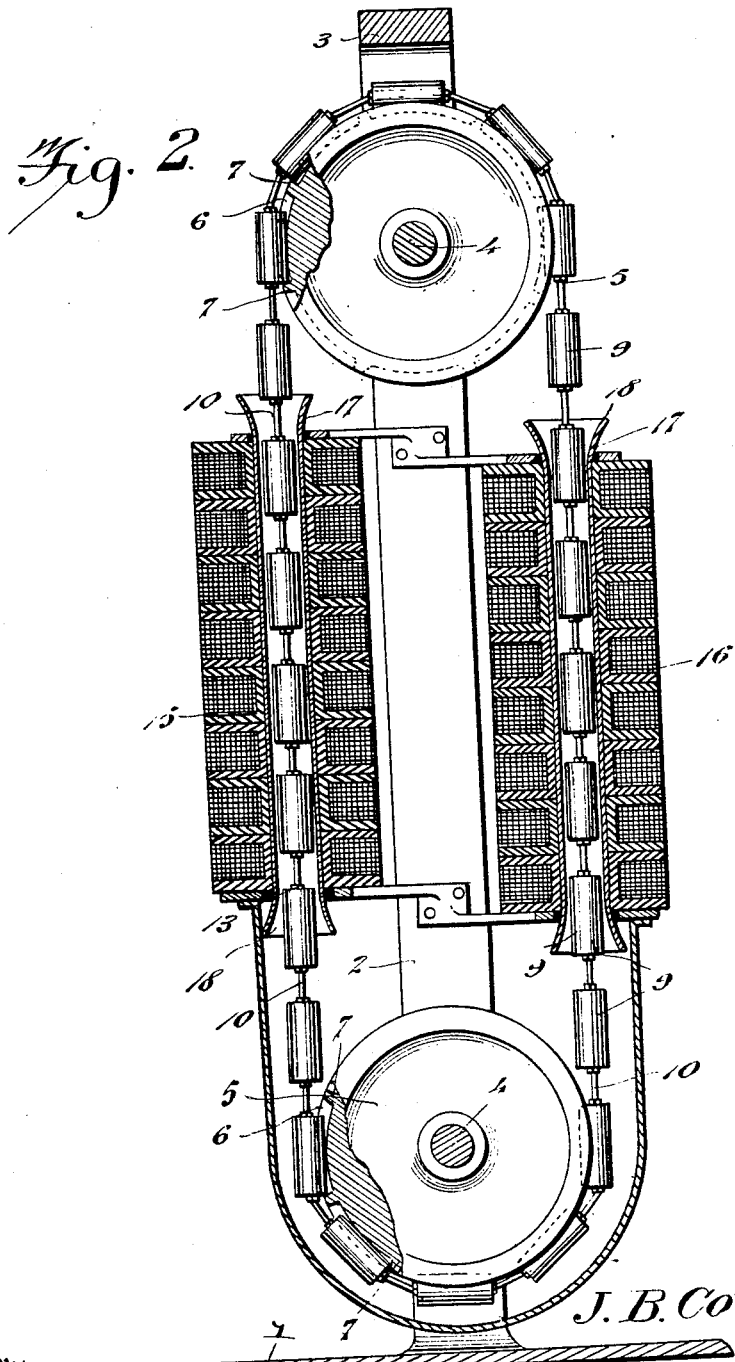

In the accompanying drawings, Figure 1 is a view in side elevation of a solenoid engine constructed in accordance with my present invention. Fig. 2 is a vertical central sectional view on the line 2—2 of Fig. 1. Fig. 3 is a diagrammatic view showing how the groups of each set are connected in the electric circuit. Fig. 4 is a detail elevation of one of the commutators. Fig. 5 is a cross sectional view through the same. Fig. 6 is a detail sectional view showing the manner of connecting the cores.

Referring now to the accompanying drawings in detail, the numeral 1 designates a base, while 2, 2 indicate standards uprising from the base and spaced apart in parallelism and having the upper ends thereof, in the present instance, connected through the medium of a yoke 3 formed integral with such standards. Journaled in alining bearings carried by the standards 2, 2 adjacent to the top and bottom ends thereof are shafts 4, 4 and upon each shaft is keyed a wheel 5 having a convexed or grooved periphery 6 formed with teeth 7, 7 appropriately spaced apart. Trained over the wheels 5, 5 is an endless belt 8 composed of iron cores 9 having the confronting ends thereof connected to each other through the medium of brass links 10. In the present instance, the connection between the adjacent ends of each link and core is in the form of a ball and socket joint, the end of the link carrying the ball 11, while the end of the core is circumferentially reduced and has a recess 12 formed therein and is threaded exteriorly to receive a nut 13 having the inner face thereof cut out as at 14 to receive the ball 11 or the end of the link and coöperating with the adjacent portion of the recess within the core to form a socket. Disposed at the opposite sides of the standards 2, 2 and fastened thereto in some appropriate manner are sets of solenoids 15, 16 surrounding the runs of the belt and each carrying an inner tube 17 formed of brass or iron and having the opposite ends thereof flared outwardly as at 18 so that the cores may enter and leave the solenoids with ease and facility.

Mounted upon the upper shaft 4 adjacent to the opposite ends thereof are commutators 19, 20 each comprising a drum 21 surrounding the respective end of the shaft 4 and suitably fixed thereto and preferably composed of insulating material. Surrounding the central portion of the drum 21 is a metallic annulus 22 from the opposite sides of which project strips 23 embedded in the material of the drum, the strips at one side of the annulus alternating with or being staggered relatively to those at the opposite side. Bearing upon the ring 22 of each drum is a brush 24, while disposed at the opposite sides of the ring or annulus 21 and adapted to be engaged by the strips 23 are brushes 25, 26. The commutator 19 is designed to control the flow of current to the solenoids of the set 15, while the commutator 20 controls the flow of current to the solenoids of the set 16. The brush 25 of each solenoid is connected to one terminal of the windings of alternate magnets of the respective set, by way of a conductor 27, while the brush 26 is connected to one terminal of the remaining magnets of such set, by way of a conductor 28. The free terminals of the magnets of each set are tapped onto a common feed wire 29 and the brushes 24 of each commutator are connected to a second feed wire 30, forming with the first-mentioned feed wire, an electric circuit, thereby connecting the sets of solenoid magnets in multiple with the circuit and the individual magnets also in multiple with such circuit.

In operation, current flows from the feeders, through the commutators and the latter control the flow of current through the solenoids in such manner that the alternate magnets of each set forming one group are energized simultaneously with the magnets of the corresponding group of the remaining set, while the groups of each set alternate with one another so that the chain of cores is actuated in an even and uniform manner. The lower wheel 5 is preferably inclosed by a casing 32 containing an oil bath so that the connections between the links and the cores constituting the chain may be lubricated. By means of the lower shaft 4 power may be taken from the motor.

From the foregoing description taken in connection with the accompanying drawings, the construction, mode of operation and manner of employing my invention will be readily apparent. It will be seen that I have provided a motor wherein the solenoids may be energized in such manner as to impart a continuous rotary movement to the chain and consequently to the driving shaft.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

I claim:

A solenoid engine comprising a plurality of cores connected in belt formation, a set of solenoid magnets surrounding each run of the belt and divided into two groups composed of alternate magnets of the set, a commutator for each set of magnets, connections between the groups of magnets of each set and the particular commutator whereby when one group is energized the other group is deënergized, corresponding groups of both sets being energized simultaneously.

In testimony whereof I affix my signature in presence of two witnesses.

JOHN B. CONRAD.

Witnesses:
S. W. DOWNEY,
E. C. JENNINGS.

Copies of this patent may be obtained for five cents each, by addressing the "Commissioner of Patents, Washington, D. C."